(12) United States Patent
Gallagher et al.

(10) Patent No.: US 11,441,598 B2
(45) Date of Patent: Sep. 13, 2022

(54) DUAL-AXIS FLEXURE GIMBAL DEVICE

(71) Applicant: Raytheon Company, Waltham, MA (US)

(72) Inventors: Jeffery M. Gallagher, Princeton, TX (US); Richard Ready, Flower Mound, TX (US); Emmanuel Fierro, McKinney, TX (US)

(73) Assignee: Raytheon Company, Waltham, MA (US)

( * ) Notice: Subject to any disclaimer, the term of this patent is extended or adjusted under 35 U.S.C. 154(b) by 730 days.

(21) Appl. No.: 16/228,368

(22) Filed: Dec. 20, 2018

(65) Prior Publication Data

US 2020/0200211 A1 Jun. 25, 2020

(51) Int. Cl.
*F16C 11/12* (2006.01)
*G02B 7/182* (2021.01)

(52) U.S. Cl.
CPC ............ *F16C 11/12* (2013.01); *G02B 7/1827* (2013.01)

(58) Field of Classification Search
CPC ....... F16C 11/12; F16D 3/005; F16M 11/123; G01C 19/22; G02B 7/182; G02B 7/1821; G02B 7/1822; Y10T 74/1293; Y10T 403/32041; Y10T 403/32049;

(Continued)

(56) References Cited

U.S. PATENT DOCUMENTS 3,131,003 A * 4/1964 Glaser .................... F16C 11/12
384/223
3,420,582 A * 1/1969 Shelley .................. F16C 11/12
403/291

(Continued)

FOREIGN PATENT DOCUMENTS

DE 352392 C 4/1922
DE 1281216 B 10/1968

(Continued)

OTHER PUBLICATIONS

Meline et al., Universal beam steering mirror design using the cross blade flexure, Aerospace Sensing, 1992, 20 pages, Orlando, Florida.

(Continued)

*Primary Examiner* — Josh Skroupa

(57) ABSTRACT

A dual-axis flexure gimbal device, such as for a fast-steering mirror assembly, can comprise a flexure spring mass body comprising first and second body sections, a flexure diaphragm that interconnects the first and second body sections, and a central aperture formed through the first and second body sections and the flexure diaphragm. A flexure unit can be situated in the central aperture, and can comprise a plurality of slots defining a plurality of flexures. The flexure diaphragm is operable to bend about first and second rotational degrees of freedom, and the plurality of flexures of the flexure unit are operable to flex about respective first and second rotational degrees of freedom. The flexure unit can comprise a plurality of slots, each having a first slot portion and a second slot portion extending in different directions to define a respective flexure. A method of making the dual-axis flexure gimbal device is provided.

27 Claims, 10 Drawing Sheets

(58) Field of Classification Search
CPC .............. Y10T 403/45; Y10T 403/453; Y10T 403/459; Y10T 403/54
USPC ........ 403/57, 58, 220, 223, 229, 291; 74/5 F
See application file for complete search history.

(56) References Cited

U.S. PATENT DOCUMENTS

| | | | | |
|---|---|---|---|---|
| 3,575,475 A * | 4/1971 | Boerner | ................. | F16D 3/005 |
| | | | | 403/291 |
| 3,597,938 A * | 8/1971 | Hellen | ................. | G01C 19/22 |
| | | | | 403/291 |
| 3,811,172 A * | 5/1974 | Bilinski | ................. | F16D 3/005 |
| | | | | 29/445 |
| 3,856,366 A * | 12/1974 | Weisbord | ............... | G01C 19/22 |
| | | | | 403/291 |
| 4,062,600 A * | 12/1977 | Wyse | ................. | G01C 19/22 |
| | | | | 74/5 F |
| 4,261,211 A * | 4/1981 | Haberland | ............... | F16C 11/12 |
| | | | | 403/291 |
| 4,269,072 A * | 5/1981 | Duncan | ................. | F16C 11/12 |
| | | | | 403/291 |
| 4,286,370 A * | 9/1981 | Craig | ................. | F16C 11/12 |
| | | | | 403/291 |
| 4,592,242 A | 6/1986 | Kempas | | |
| 4,694,703 A * | 9/1987 | Routson | ................. | G01C 19/22 |
| | | | | 403/291 |
| 4,825,713 A * | 5/1989 | Wilkey | ................. | G01C 19/22 |
| | | | | 74/5 F |
| 5,144,743 A * | 9/1992 | Kempas | ................. | F16D 3/72 |
| | | | | 74/5 F |
| 5,302,044 A * | 4/1994 | Spariat | ................. | B64G 1/641 |
| | | | | 403/291 |
| 7,497,139 B2 * | 3/2009 | Maier | ................. | G01C 19/16 |
| | | | | 74/5 F |
| 7,832,880 B2 * | 11/2010 | Craig | ................. | A47G 1/215 |
| | | | | 359/872 |
| 8,240,941 B2 * | 8/2012 | Kibel | ................. | F16C 11/12 |
| | | | | 403/291 |
| 2007/0067953 A1 * | 3/2007 | Vermeulen | ............. | F16C 11/12 |
| | | | | 16/225 |
| 2010/0067980 A1 | 3/2010 | Kibel | | |

FOREIGN PATENT DOCUMENTS

| | | | | |
|---|---|---|---|---|
| JP | 03075517 A | * | 3/1991 | ............. G01C 19/18 |
| JP | H03-75518 A | | 3/1991 | |

OTHER PUBLICATIONS

Riverhawk Company, Suggested Methods of Mounting Free-Flex Pivots, http://flexpivots.com/wp-content/uploads/2014/07/Riverhawk-FlexuralPivotSuggestedMethodofMounting.pdf, to the best of applicant's knowledge article was available before the application filing date, 6 pages, New Hartford, New York.
International Search Report for International Application No. PCT/US2019/056776 dated May 6, 2020, 17 pages.

* cited by examiner

DUAL-AXIS FLEXURE GIMBAL DEVICE

BACKGROUND

Mechanisms requiring two-axis pivot capability typically utilize a universal joint coupler with ball bearings or bushings to allow the pivot motion between moving bodies. In some applications (e.g., a high-precision mechanism like a steering mirror or scan mirror), however, the wear, slop, and limited life typical of bearings or bushings can be very expensive to overcome.

Flexural pivots are often utilized as a substitute for bearings in bushings in precision applications. Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
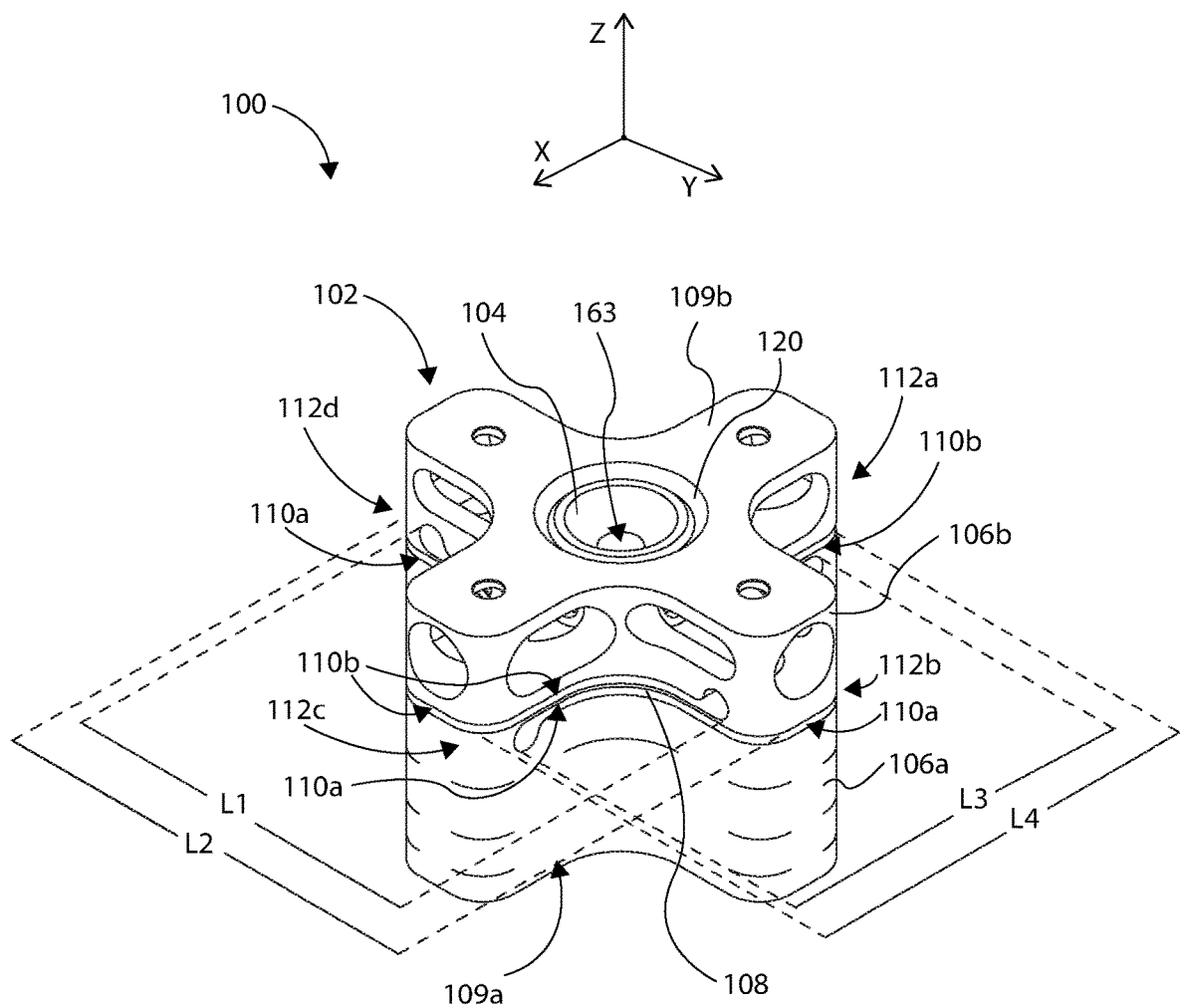
FIG. 1 is an isometric view of a dual-axis flexure gimbal device in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a flexure unit operable for use with a flexure spring mass body comprising a body having an outer surface; a first slot formed in the flexure body through the outer surface (the first slot comprising a first slot portion and a second slot portion extending in different directions); and a second slot formed in the flexure body opposite the first slot through the outer surface (the second slot comprising a first slot portion and a second slot portion extending in different directions). The first and second slots, at least in part, can define first and second flexures that facilitate flex of the flexure unit in a first rotational degree of freedom.

In one example, the flexure unit can further comprise: a third slot formed in the flexure body through the outer surface (the third slot comprising a first slot portion and a second slot portion extending in different directions); and a fourth slot formed in the flexure body opposite the third slot through the outer surface (the fourth slot comprising a first slot portion and a second slot portion extending in different directions). The third and fourth slots, at least in part, can define third and fourth flexures that facilitate flex of the flexure unit in a second rotational degree of freedom.

In one example, the first and second flexures are radially oriented substantially ninety degrees around the outer surface relative to the third and fourth flexures.

In one example, the first and second slots are formed in a nesting arrangement with the third and fourth slots.

In one example, the first, second, third, and fourth slots are configured similar to or the same as each other, and wherein the first and second slots are formed in a mirrored configuration relative to one another, and the third and fourth slots are formed in a mirrored configuration relative to one another.

The present disclosure sets forth a flexure unit comprising a body, a first longitudinal flexure defined by a first pair of overlapping portions of first and second slots formed in the body, and a second longitudinal flexure defined by a second pair of overlapping portions of the first and second slots formed in the body.

In one example, the flexure unit can comprise a third longitudinal flexure defined by a first pair of overlapping portions of third and fourth slots formed in the body, and a fourth longitudinal flexure defined by a second pair of overlapping portions of the third and fourth slots formed in the body.

The present disclosure sets forth a flexure spring mass body comprising: a first body section, a second body section operable to bend relative to the first body section, and a flexure diaphragm that interconnects the first body section to the second body section. The flexure diaphragm can be define by a first slot formed laterally through the flexure spring mass body about a first plane, and by a second slot formed laterally through the flexure spring mass body about a second plane. The second slot can be formed orthogonally relative to the first slot, such that the flexure diaphragm facilitates bending of the second body section relative to the first body section.

In one example, the first slot comprises a length that is less than a corresponding overall length of the first body section, and the second slot comprises a length that is less than a corresponding overall length of the first body section in an orthogonal direction.

In one example, the first and second body sections each comprise a stop portion formed about a peripheral edge portion of the respective first and second body section and adjacent a respective first and second slots. The stop portion can be operable to limit movement of the second body section relative to the first body section.

The present disclosure sets forth a dual-axis flexure gimbal device comprising a flexure spring mass body comprising first and second body sections, a flexure diaphragm that interconnects the first and second body sections, and a central aperture formed through the first and second body sections and the flexure diaphragm. A flexure unit can be situated in the central aperture and supported by the flexure spring mass body, and can comprise a plurality of slots defining a plurality of flexures. In response to bending of the first body section relative to the second body section, the flexure diaphragm is operable to bend in first and second rotational degrees of freedom, and the plurality of flexures of the flexure unit are operable to flex in respective first and second rotational degrees of freedom.

In one example, the flexure unit can be attached to the flexure spring mass body, such that the flexure unit restricts axial movement of the first body section relative to the second body section in an axial z direction.

In one example, the first body section comprises an optical mirror interface for mounting to an optical mirror, and the second body section comprises a gimbal support housing interface for mounting to a gimbal support body.

In one example, the plurality of flexures of the flexure unit are formed generally parallel to a central longitudinal axis of the central aperture, and wherein the flexible diaphragm is formed generally perpendicular relative to the flexures and to the central longitudinal axis.

The present disclosure sets forth a method of making a dual-axis flexure gimbal device comprising forming a flexure spring mass body comprising first and second body sections, a flexure diaphragm that interconnects the first and second body sections together, and a central aperture formed through the first and second body sections and the flexure diaphragm. The method can comprise forming a flexure unit comprising a body sized and shaped to fit within the central aperture of the flexure spring mass body. The flexure unit can comprise a plurality of slots that define a plurality of flexures.

To further describe the present technology, examples are now provided with reference to the figures. With reference to FIGS. 1-4C, various aspects of a flexure gimbal device 100 are shown in accordance with an example of the present disclosure. As an overview, in one example the flexure gimbal device 100 can be incorporated with an optical assembly (such as the optical assembly 200 shown in FIGS. 5A and 5B) for restricting movement of an optical mirror 202 operable to tip-tilt (i.e., rotate about the x,y axes) via actuation of a gimbal control mechanism (e.g., gimbal control mechanism 204 of the optical assembly 200 shown in FIGS. 5A and 5B). It should be appreciated, however, that the flexure gimbal device 100 can be incorporated into other systems that could benefit from a flexure device that restricts at least some degree of motion of one body relative to another body.

In one example, as shown, the flexure gimbal device 100 can comprise a two-piece design or configuration (i.e., a two-piece device) comprising a flexure spring mass body 102 and a flexure unit 104 operable with each other as will be described herein. As illustrated, the flexure unit 104 can be situated within or coupled to the flexure spring mass body 102. The flexure spring mass body 102 can be operable to bend or flex about two axes to provide two rotational degrees of freedom, such as about the x axis and the y axis, while the flexure unit 104 can be operable to flex or bend about the same x,y axes to also provide two rotational degrees of freedom, but not others, which permits the flexure spring mass body 102 to bend about the x,y axes (i.e., two degrees of freedom), with the flexure unit 104 restricting movement in the other four degrees of freedom (i.e., rotation about the z axis, and axial movement about the x,y,z axes).

More specifically, the flexure spring mass body 102 can comprise a first body section 106a and a second body section 106b, and a flexure diaphragm 108 that interconnects the first body section 106a to the second body section 106b. In this manner, the first and second body sections 106a,106b are operable to be rotated relative to one another while the flexure diaphragm 108 bends or flexes (in the x axis, in the y axis, or both). For example, the second body section 106b can be moved by controlled operation of a motor (e.g., one or more of four voice coils 206 of the gimbal control mechanism 204 that can be actuated to tip and/or tilt the optical mirror 202). Note that the gimbal control mechanism 204 is shown generically as a box, but it should be appreciated by those skilled in the art that the gimbal control mechanism 204 can comprise a number of known components and devices that operate to control the voice coils 206 to actuate the optical mirror 202. The second body section 106b can comprise a mount surface 109b (e.g., such as an optical mirror interface that is attached to (e.g., adhered) an inner surface 208 of the optical mirror 202), and the first body section 106a can comprise a mount portion 109a (e.g., a gimbal support housing interface, mounted or otherwise attached to a support housing 210 of the optical assembly 200). Thus, the first body section 106a can be fixed to a support housing (e.g., support housing 210), while the second body section 106b is operable to rotate relative to the first body section 106a upon operation of the motor (e.g., upon operation of voice coil(s) 206 that actuate the optical mirror 202). In one example, and with reference to FIGS. 5A and 5B, the gimbal control mechanism 204 may be operable to rotate the optical mirror 202 just a few degrees (e.g., half of a degree) in the tip-tilt directions to control the angle of the optical mirror 202 for purposes of image stabilization to avoid pixels from shifting around (i.e., pixels of an image sensor that receive reflected light from the optical mirror 202). The optical mirror 202 can be comprised beryllium, or other suitable mirror material, having a mirror surface that can tip-tilt upon actuation.

Figure 3A:
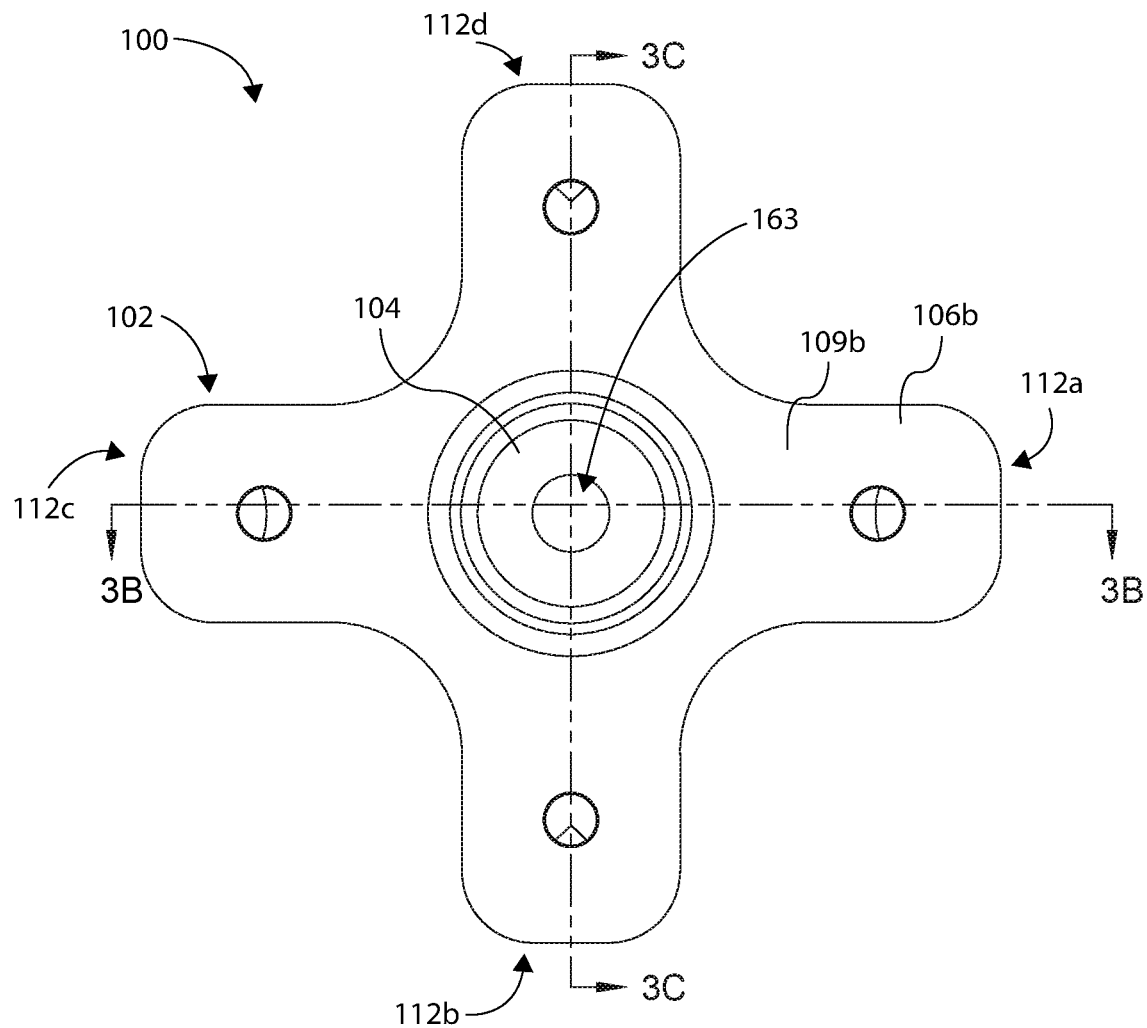
FIG. 3A is a top view of the dual-axis flexure gimbal device of FIG. 1.
Figure 3B:
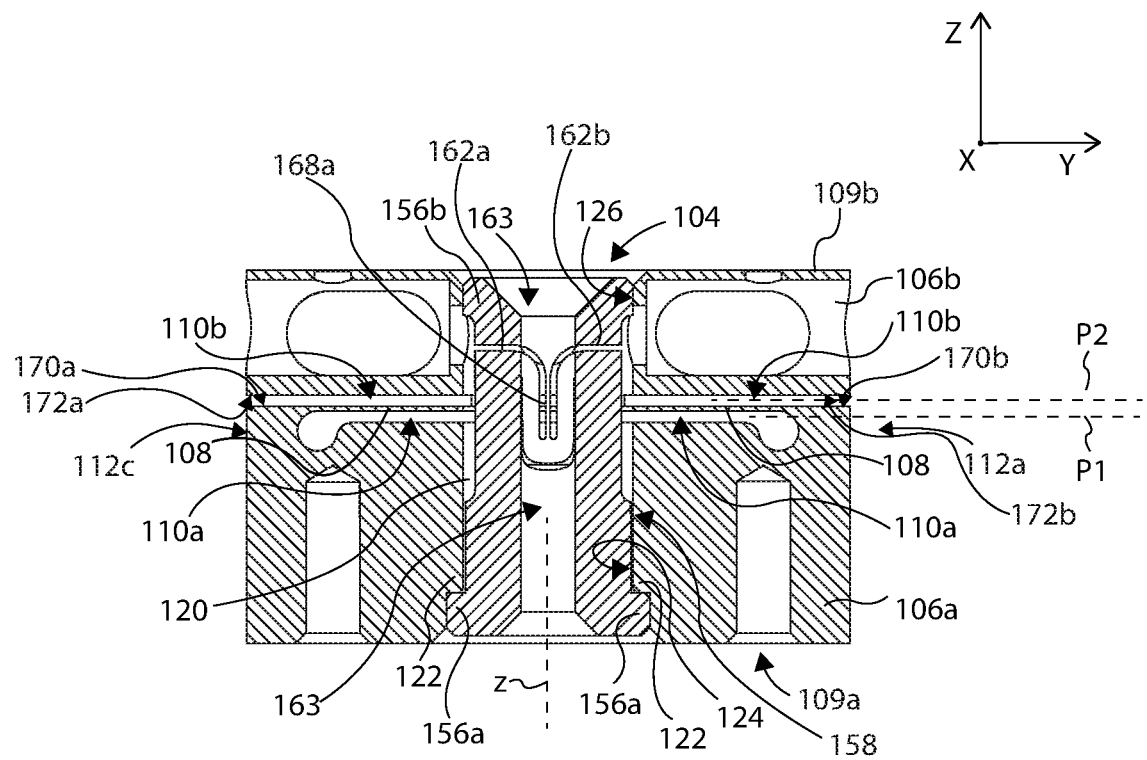
FIG. 3B is a cross sectional view of the dual-axis flexure gimbal device of FIG. 3A, and taken along lines 3B-3B.
Figure 3C:
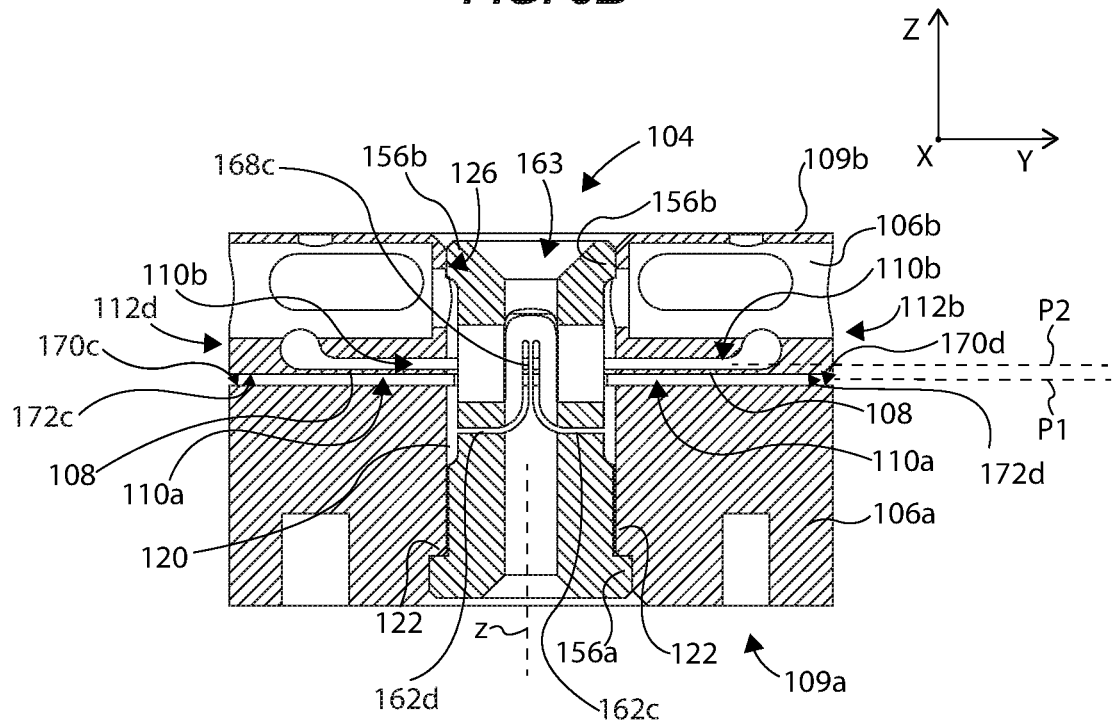
FIG. 3C is a cross sectional view of the dual-axis flexure gimbal device of FIG. 3A, and taken along lines 3C-3C.
Figure 4A:
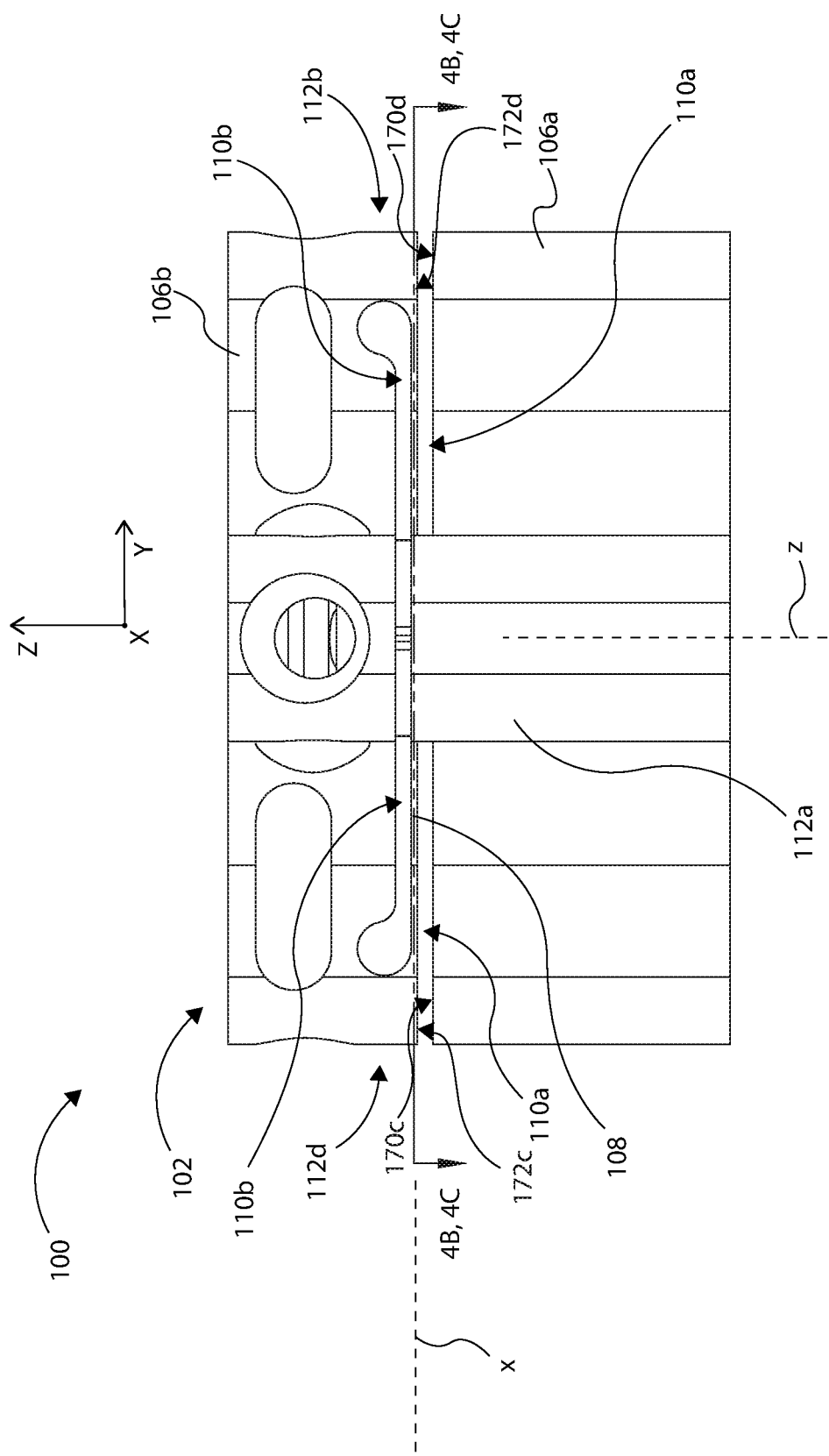
FIG. 4A is a side view of the dual-axis flexure gimbal device of FIG. 1.
Figure 4B:
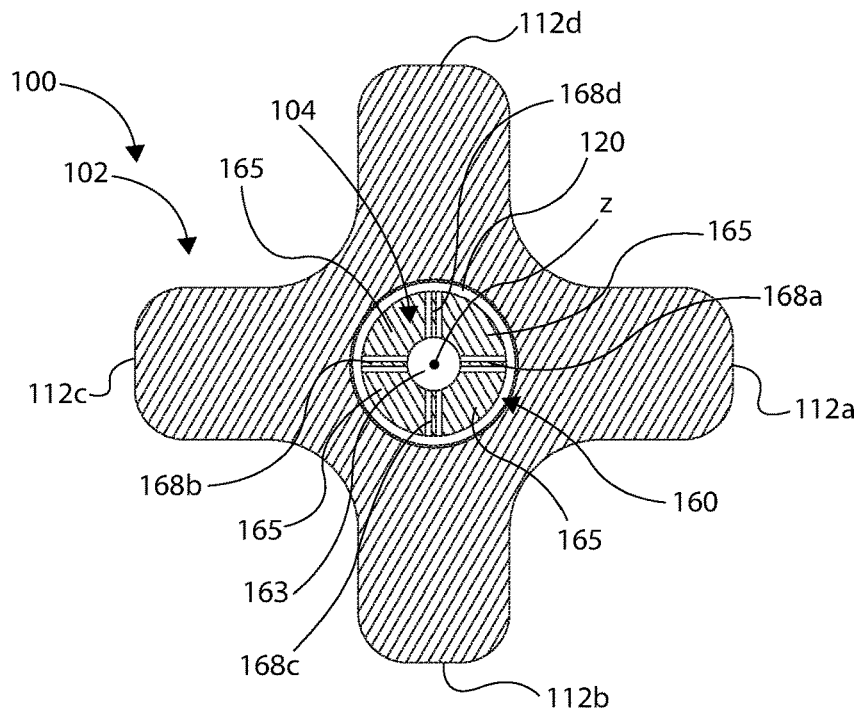
FIG. 4B is a cross sectional view of the dual-axis flexure gimbal device of FIG. 4A, and taken along lines 4B-4B.

With particular reference to FIGS. 1, 3A-3C, and 4A, the flexure diaphragm 108 of the flexure spring mass body 102 can be defined by a first slot 110a formed laterally through the flexure spring mass body 102 about a first plane P1 (i.e., a horizontal plane about the y axis), and the flexure spring mass body 102 can further defined by a second slot 110b formed laterally through the flexure spring mass body 102 about a second plane P2 (i.e., a horizontal plane about the y axis). As shown in FIGS. 3B and 3C, the first plane P1 can be spatially offset from the second plane P2, which provides and defines a sheet or panel of material between the first and second slots 110a and 110b, thereby generating or forming the flexible diaphragm 108. In some examples, the planes P1 and P2 and the first and second slots 110a and 110b can be parallel to one another.

Figure 4C:
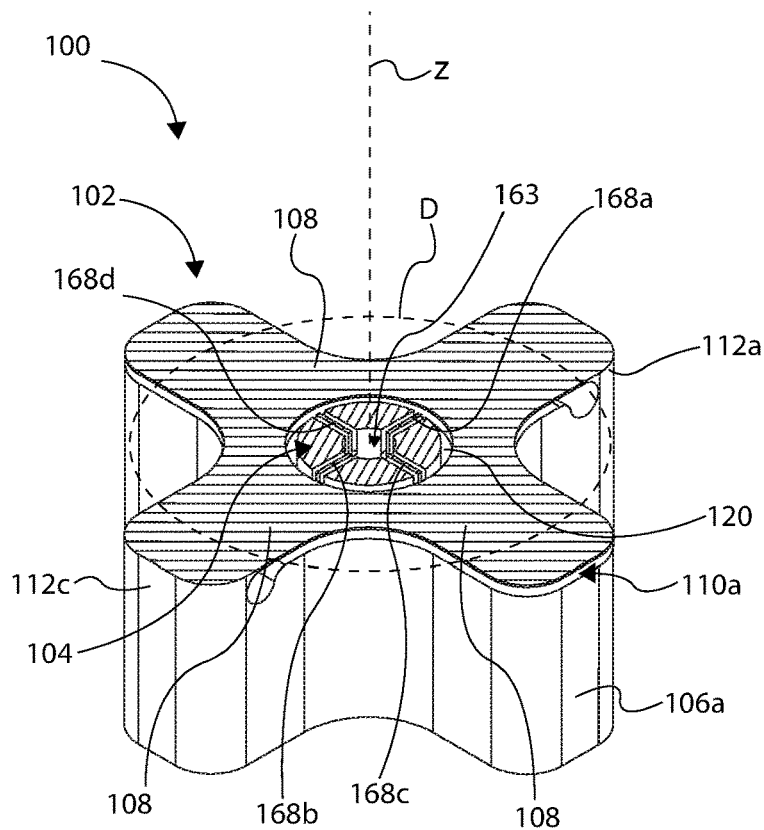
FIG. 4C is a cross sectional top view of the dual-axis flexure gimbal device of FIG. 4B.
Figure 5A:
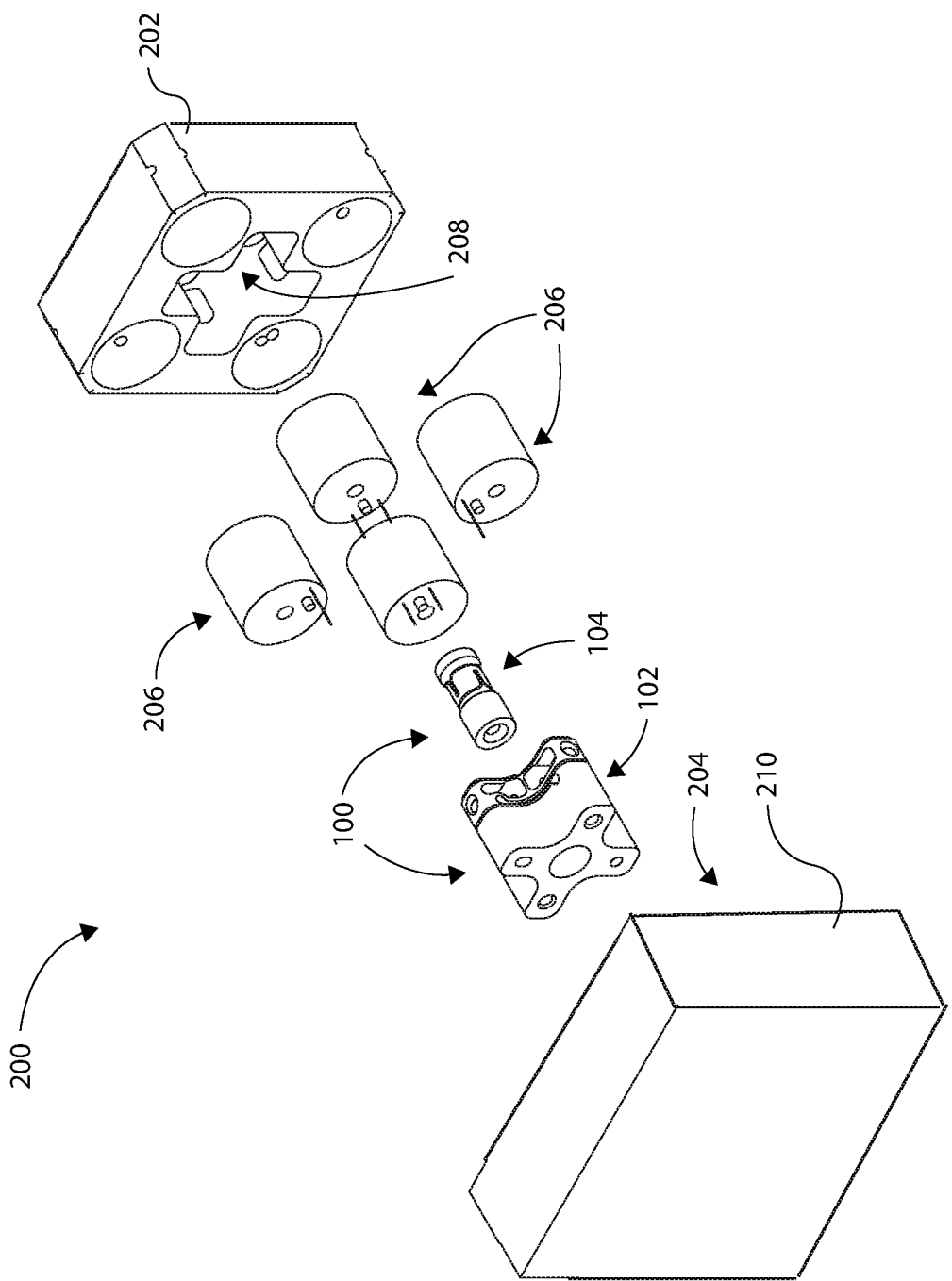
FIG. 5A is an exploded view of an optical assembly incorporating the dual-axis flexure gimbal device of FIG. 1.
Figure 5B:
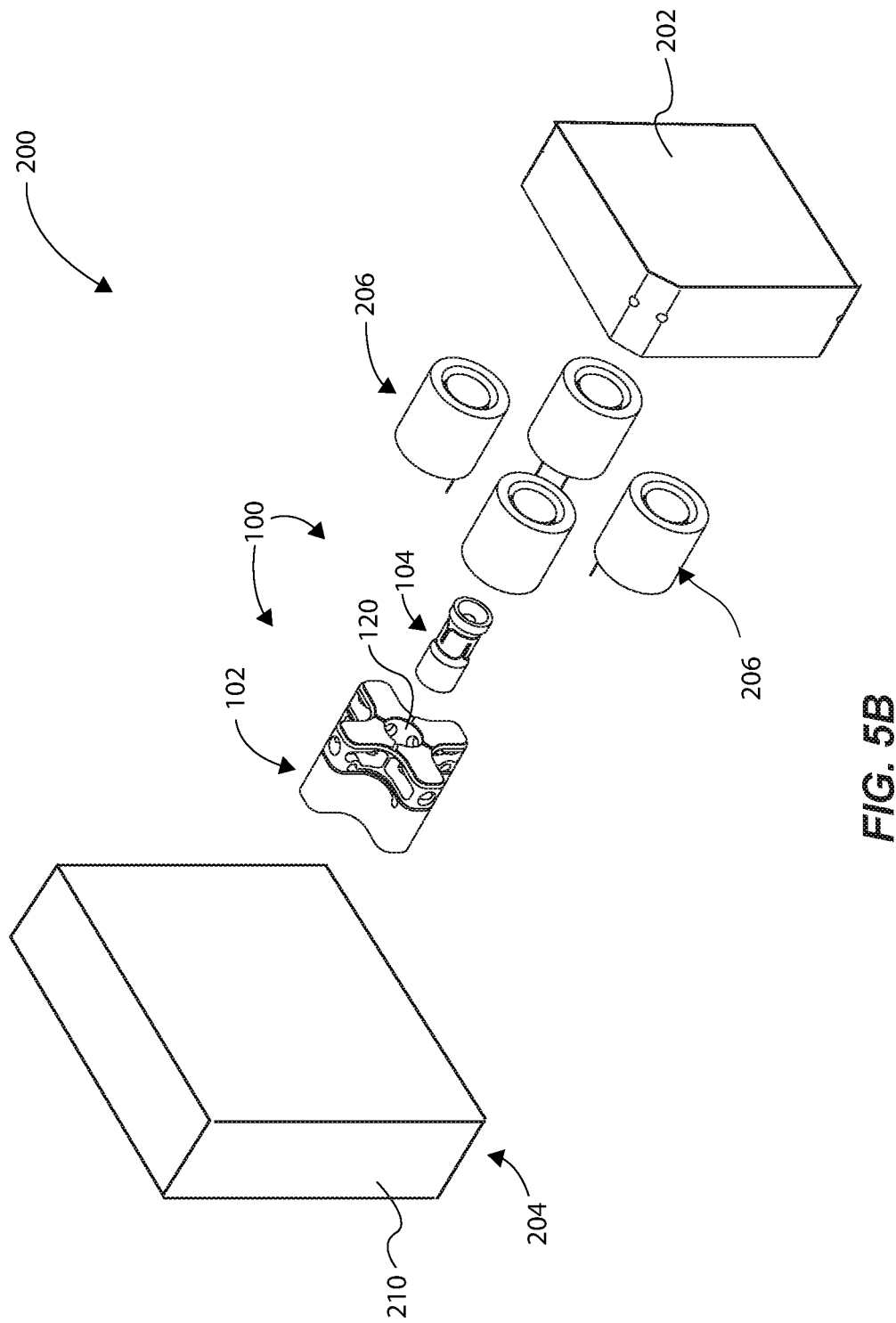
FIG. 5B is an exploded view of the optical assembly incorporating the dual-axis flexure gimbal device of FIG. 1, and shown from another angle compared to FIG. 5A.

In one example, the first and second slots 110a and 110b can be formed and can extend in directions generally orthogonal relative to one another. In one example in which an electric discharge machine (EDM) wire machining process is used to form the first and second slots 110 and 110b, the first slot 110a can be formed by operation of the electric (EDM) process can "cut" or remove material laterally from the flexure spring mass body 102 to form the first slot 110a having a length L1 that is less than an overall lateral length L2 of the flexure spring mass body 102 along the y axis along plane P1. Similarly, the second slot 110b can be formed by operation of the EDM process to "cut" or remove material laterally from the flexure spring mass body 102 to form the second slot 110b having a length L3 that is less than an overall lateral length L4 of the flexure spring mass body 102 along the x axis along plane P2. In this manner, an amount of structural material can be caused to remain at peripheral areas of respective four diaphragm support regions 112a-d of the first and second body sections 106a and 106b. Thus, the flexible diaphragm 108 can be fixed or attached at all four diaphragm support regions 112a-d. Note that diaphragms support regions 112a and 112c are on opposite sides of each other of the flexure spring mass body 102, and diaphragm support regions 112b and 112d are on opposite sides of each other of the flexure spring mass body 102 (and situated about 90 degrees relative to diaphragms support regions 112a and 112c). In this way, the second body section 106b can tip or bend about the x axis while being constrained by the diaphragms support regions 112a and 112c, and the second body section 106b can tilt or bend about the y axis while be constrained by the diaphragms support regions 112b and 112d. The height of the first and second slots 110a,110b can be sized as needed, such as to prevent over rotation. Note that the flexure spring mass body 102 can have a general plus or cross-shaped configuration (from above; see FIG. 4B), but other shapes are contemplated herein, such as square, rectangular, oval, circular, polygon, irregular, and other suitable shapes. Note that FIG. 4C shows a dotted circular area with the reference label "D" to proximately indicate an area or boundary of the flexible diaphragm 108.

The flexure spring mass body 102 can be comprised of a monolithic piece of material or mass, and can be made of steel, titanium, aluminum, or other material. As shown, the flexible diaphragm 108 can be relatively thin, which under certain loading conditions, can cause it to be subject the flexible diaphragm 108 to potential damage from being over constrained due to bending or other forces acting on the second body section 106b. As one solution to mitigate this issue, the flexure unit 104 can be operatively coupled to the flexure spring mass body 102 to permit rotation of the second body section 106b in two degrees of freedom, such as about the x,y axes, while providing sufficient torsional strength to restrict movement of the second body section 106b in the other the degrees of freedom. As will be further discussed below, the shape, size, diameter, slot configuration of the flexure unit 104 can be selected and tailored to provide such functionality.

More particularly, and with reference to the example shown in FIGS. 1-5B, the flexure unit 104 can comprise a body 150, which can be generally cylindrically shaped (although other shapes are contemplated herein, such as cuboid, polygon, or other suitable shapes). A central aperture 120 can be formed or defined through the first and second body sections 106a and 106b, and the flexure diaphragm 108 of the flexure spring mass body 102. The central aperture 120 can be defined by a hole through each of the first and second body sections 106a and 106b, and a hole through the flexure diaphragm 108, which holes can have various cross sectional areas and shapes along the central aperture 120. As shown, the flexure unit 104 can be situated within the central aperture 120, and supported by the flexure spring mass body 102. The body 150 of the flexure unit 104 can comprise first and second ends 152a and 152b, and a flex section 154 that extends some distance between the first and second ends 152a and 152b. The first end 152a can comprise an annular flange 156a that interfaces with a shoulder 122 (FIG. 3C) formed in the first body section 106a of the flexure spring mass body 102. This interface between the annular flange 156a and the shoulder 122 axially positions and aligns the flexure unit 104 with the flexure spring mass body 102 about the z axis. In one example, the flexure unit 104 can be brazed or adhered or otherwise secured to the flexure spring mass body 102, such as via an attachment between an interface wall 158 of the flexure unit 104 and an interface wall 124 of the first body section 106a of the flexure spring mass body 102 (see FIG. 3B). The second end 152b of the flexure unit 104 can comprise an annular flange 156b that is interfaced or attached (e.g., brazed) to an inner surface 126 of the second body section 106b (see FIG. 3B), so that the second end 152b of the flexure unit 104 is fixed to the second body section 106b. In this way, the flexure unit 104, with its flex section 154, can bend or flex, such as about the x axis or the y axis, or both, when the second body section 106b is rotated relative to the first body section 106b about the same x or y axes, or both.

Figure 2A:
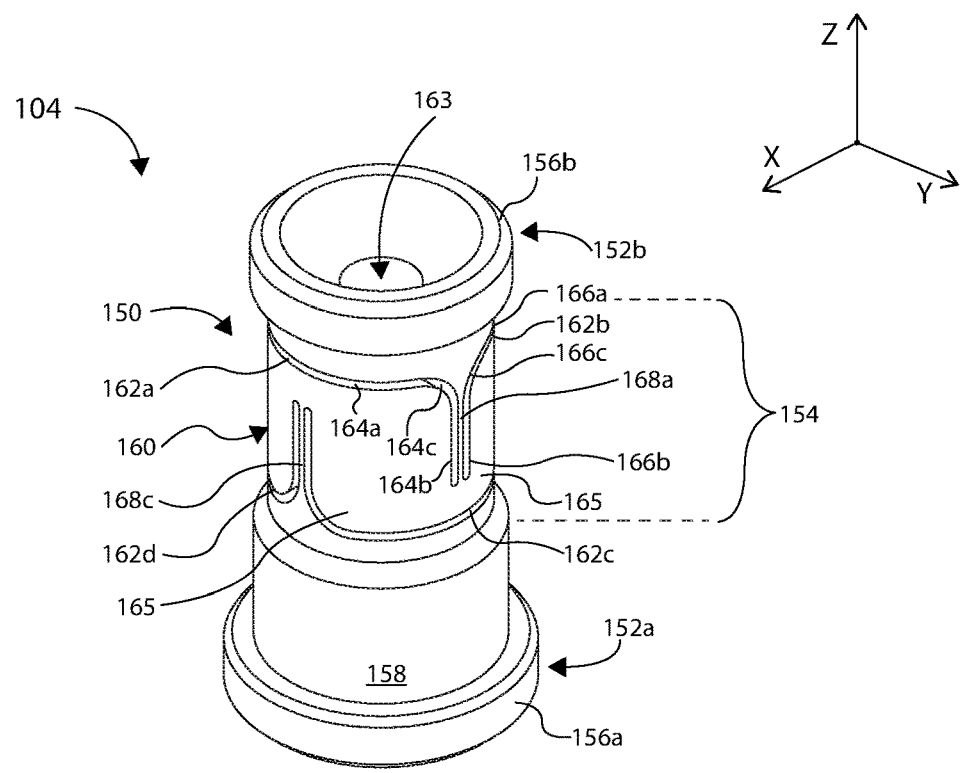
FIG. 2A is an isometric view of a flexure unit of the dual-axis flexure gimbal device of FIG. 1.
Figure 2B:
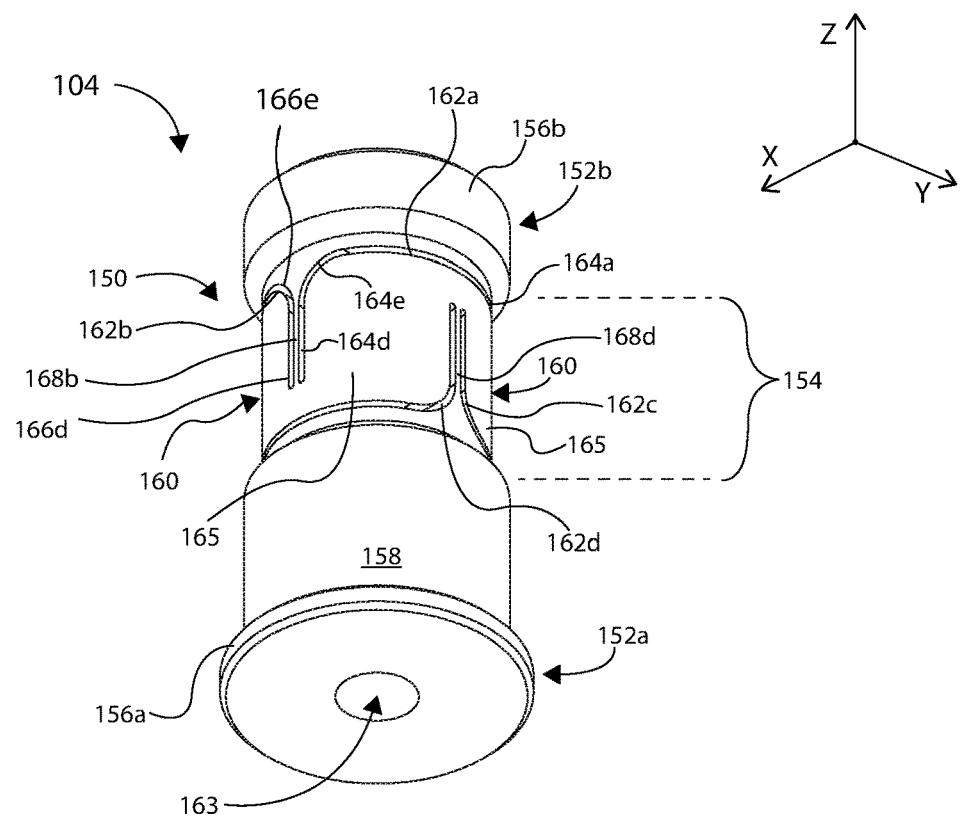
FIG. 2B is an isometric view from a lower side of the flexure unit of FIG. 2A of the dual-axis flexure gimbal device of FIG. 2A.

The body 150 can comprise an outer surface 160, which include various radial or annular surfaces that extend some distance between the first end 156a to the second end 156b. The flex section 154 can comprise a cylindrical configuration having a uniform circular cross-section at any point about a central longitudinal z axis, and can include a plurality of slots 162a-d formed through the outer surface 160, and that are each in fluid communication with a central aperture 163 of the flexure unit 104. As shown in FIGS. 2A, 2B and 4B, the slots 162a-d can be formed through the outer surface 160 and a radial wall section 165 of the body 150, so that the slots 162a-d are in fluid communication with each other about the central aperture 163. The slots 162a-d can be substantially identical to each other, as shown, or they can be differently formed and configured. The slots 162a and 162b can define a first pair of slots (first and second slots) that oppose each other, meaning that they are formed through different radial sides of the body 150. The other slots 162c and 162d can define a second pair of slots (third and fourth slots) that oppose each other, meaning that they are formed through different radial sides of the body 150. Each slot 162a-d can be formed into the body, such that each slot extends less than 180 degrees radially around the perimeter or outer surface 160 of the body 150 along a plane oriented along the x,y axes. The first pair of slots 162a and 162b can be positioned on opposing sides of the flexure unit 104, and oriented approximately 90 degrees, about the z axis rotationally, relative to the second pair of slots 162c and 162d, which can be positioned on opposing sides of the flexure unit 104. The first pair of slots 162a and 162b can be in a mirrored configuration relative to one another about a vertical or longitudinal plane extending in the y,z axes through the body 150, and can the second pair of slots 162c and 162d be in a mirrored configuration relative to one another about a vertical or longitudinal plane extending in the x,z axes. Moreover, the second pair of slots 162c and 162d can be formed in an inverted orientation and rotated position (rotated 90 degrees about the body 150) relative to the first pair of slots 162a and 162b, such that the first and second pairs of slots are in a nested arrangement about the flex section 154 of the body 150.

Each slot 162a-d can comprise a first slot portion and a second slot portion that extend in different directions relative to each other, such as in at least two different directions. For instance, as shown in FIG. 2A, the first slot 162a can comprise a first slot portion 164a that can extend generally in a radial direction around the body 150 about a plane along y and x axes, and a second slot portion 164b that extends in a longitudinal direction about the body 150, and orthogonal relative to the first slot portion 164a, about a plane along x and z axes. A transition or curved slot portion 164c can extend between the first and second slot portions 164a and 164b, or the first and second slot portions 164a and 164b can intersect at a right angle. Similarly at the other end of the first slot 162a, as shown in FIG. 2B, a third slot portion 164d extends in a longitudinal direction about the body 150, and orthogonal relative to the first slot portion 164a, about a plane along x and z axes. A transition or curved slot portion 164e can extend between the first and third slot portions 164a and 164d, or the first and third slot portions 164a and 164d can intersect at a right angle. Note that the second and third slot portions 164b and 164d are similar to each other, and are generally formed at opposing ends of the first slot portion 164a, but at a radial distance such that the second and third slot portions 164b and 164d are less than 180 degrees apart from one another around the body 150.

Similarly, as shown in FIG. 2A, the second slot 162b can comprise a first slot portion 166a that can extend generally in a radial direction around the body 150 about a plane along the y and x axes, and a second slot portion 166b that extends in a longitudinal direction about the body 150, and orthogonal relative to the first slot portion 166a, about a plane along the x and z axes. A transition or curved slot portion 166c can extend between the first and second slot portions 166a and 166b, or the first and second slot portions 166a and 166b can intersect at a right angle. As shown in FIG. 2B, the second slot 162b can comprise, at its other end, a third slot portion 166d that extends in a longitudinal direction about the body 150, and orthogonal relative to the first slot portion 166a, about a plane along the x and z axes. A transition or curved slot portion 166e can extend between the first and third slot portions 166a and 166d, or the first and third slot portions 166a and 166d can intersect at a right angle. Note that the second and third slot portions 166b and 166d are similar to each other, and are generally formed at opposing ends of the first slot portion 166a, but at a radial distance such that the second and third slot portions 166b and 166d are less than 180 degrees apart from one another around the body 150). Further note that each of the first and second slots 162a and 162b are symmetrically formed about a z axis that extends centrally through respective first slot portions 164a and 166a.

Notably, the second slot portions 164b and 166b of the first and second slots 162a and 162b, respectively, extend longitudinally about the z axis, and define respective terminal ends of the slots 162a and 162b. The second slot portions 164b and 166b are formed and positioned relative to one another so as to be next to or adjacent one another, but are spatially separated from each other a particular distance so as to define a first flexure 168a of the flexure unit 104. Similarly, a second flexure 168b is formed or defined by the similar relative positioning of the third slot portions 164d and 166d of the first and second slots 162a and 162b, respectively. Thus, each of the first and second flexures 168a and 168b extend along a longitudinal or z axis and also intersect a plane defined along the x,y axes that extends laterally or horizontally through the body 150. The first and second flexures of the flexure unit 104 can be formed generally parallel to a central longitudinal axis of the central aperture, and the flexible diaphragm 108 of the flexure spring mass body 102 can be formed generally perpendicular relative to the first and second flexures 168a and 168b and to the central longitudinal axis. Because the first and second flexures 168a and 168b are relatively thin wall sections formed in this manner, and therefore are elastic or compliant in response to a load, the second end 152b of the flexure unit 104 is operable to bend or flex (i.e., rotate) about the y axis back-and-forth about the first and second flexures 168a and 168b, in response to the second body section 106b of the flexure spring mass body 102 being rotated about the y axis (i.e., when the attached optical mirror is actuated in such rotational direction about the y axis).

As can be appreciated from the views of FIGS. 2A and 2B, the second pair of slots 162c and 162d, being similarly formed and arranged as the first pair of slots 162a and 162b, can be formed in a mirror-like manner about a plane defined along the x,y axes relative to the first pair of slots 162a and 162b, and also rotated or oriented 90 degrees relative to the first pair of slots 162a and 162b. For purposes of illustration clarity, the various slot sections of the second pair of slots 162c and 162d will not be labeled, but they can have the same or similar slot path configuration as slots 162a and 162b. Accordingly, the second pair of slots 162c and 162d can define third and fourth flexures 168c and 168d. Thus, each of the third and fourth flexures 168c and 168d extend along a longitudinal or z axis, and also intersect a plane defined along the x,y axes that extends laterally or horizontally through the body 150. The third and fourth flexures 168c and 168d of the flexure unit 104 can be formed generally parallel to a central longitudinal axis of the central aperture, and the flexible diaphragm 108 of the flexure spring mass body 102 can be formed generally perpendicular relative to the first and second flexures 168a and 168b and to the central longitudinal axis. Because the third and fourth flexures 168c and 168d are relatively thin wall sections formed in this manner, and therefore are elastic or compliant in response to a load, the second end 152b of the flexure unit 104 is operable to bend or flex (i.e., rotate) about the x axis back-and-forth about the third and fourth flexures 168c and 168d, in response to the second body section 106b of the flexure spring mass body 102 being rotated about the x axis (i.e., when the attached optical mirror is actuated in such rotational direction about the x axis).

As can be appreciated from the views of FIGS. 2A and 2B, the first pair of slots 162a and 162b can be formed in a nesting arrangement with the second pair of slots 162c and 162d, where the terminal ends (e.g., of slot portions 164b and 166b) of each respective slot (e.g., 162a and 162b) are nested radially and laterally between overlapping terminal ends of adjacent slots (e.g., 162c and 162d) on either side of the terminal ends (e.g., 164b and 166b) approximately 90 degrees on either side.

Accordingly, in this example, four flexures 168a-d are formed in the body 150 of the flexure unit 104, and are operable to facilitate flex of the flexure unit 104 and the flexure spring mass body 102 in respective first and second rotational degrees of freedom (x,y axes), and to restrict relative movement of the second body section 106b relative to the first body section 106a (FIG. 1) of the flexure spring mass body 102 in other degrees of freedom. The flexible diaphragm 108 can be configured and is operable to bend or flex in the same direction(s) and degrees of freedom as the flexure unit 104. Notably, a diameter D1 of the flex section 154 (being the smallest diameter of the flexure unit 104, in this example) is relatively large, so that a certain amount of material thickness of the radial wall section 165 is provided to generate a sufficient amount of resistance to axial forces acting on the flexure unit 104. In this way, while permitting or facilitating limited rotational movement of the first and second body sections 106a,106b relative to one another in the x and y axes, the flexure unit 104 can restrict axial or translational movement of the second body section 106b relative to the first body section 106a in the x axis and the y axis. As noted above, the flexure unit 104, being attached to the flexure spring mass body 102, also restricts axial or translational movement in the z direction of the second body section 106b relative to the first body section 106a, because of the tension characteristics of the flexure unit 104. That is, because the flexure unit 104 can be comprised of a rigid or semi-rigid material, it provides a certain amount of tensile strength so that it cannot be pulled or be deflected axially about the z axis, which prevents the second body section 106b from axial movement in the z direction, which could damage the flexible diaphragm 108.

As can be seen, the flexure unit 104 functions to facilitate rotation of the first body section 106a relative to the second body section 106b of the flexure spring mass body 102 in the designated and desired degrees of freedom, while at the same time preventing rotation of the same in any other degree of freedom. As such, the rotational capabilities, such as the stiffness of the flexure unit, and therefore the flexure spring mass body 102, can be selected and varied depending upon the type and configuration of the flexure unit 104 secured thereto, and caused to be operable therewith. Indeed, within the same flexure spring mass body 102 design and configuration, stiffness of the flexures and the degree of movement in one flexure spring mass body 102 can be different from that in a different or another flexure spring mass body 102 by selecting different types of flexure units having different flex profiles.

In one example, the first and second body sections 106a and 106b of the flexure spring mass body 102 can each comprise a stop portion (e.g., see stop portions 170a-d and 172a-d (FIGS. 3B and 3C)) respectively, formed about a peripheral edge portion of the respective first and second body sections 106a and 106b, and adjacent respective first and second slots 110a and 110b. As an overview, the stop portions 170a-d and 172a-d act as a travel limit stop to restrict or limit over-bending of the second body section 106b relative to the first body section 106a. More specifically, the stop portions 170a-d can be surface or corner portions formed about corner end areas of the first body section 106a, and stop portions 172a-d can be surface or corner portions formed about corner end areas of the second body section 106b and that oppose or face respective stop portions 170a-d. The respective stop portions 170a-d and 172a-d can be separated from each other by the height distance or gap of respective first and second slots 110a and 110b, and operate to limit deflection or movement of the second body section 106b relative to the first body section 106a. This may be particularly beneficial when handling or assembling the flexure spring mass body 102 into an assembly (e.g., optical assembly) to limit the amount of bending or flexing experienced by the flexible diaphragm 108. In some examples, the flexible diaphragm 108 can be relatively thin, and therefore susceptible to over bending (i.e., flexing beyond a predetermined degree) when being assembled, even with just a few degrees of bending movement. Accordingly, in the event of such over bending, the respective stop portions 170a-d and 172a-d will contact or interface with each other to stop or limit deflection of the second body section 106b relative to the first body section 106a, thus protecting the flexible diaphragm 108 from flexing beyond a predetermined degree.

Figure 6:
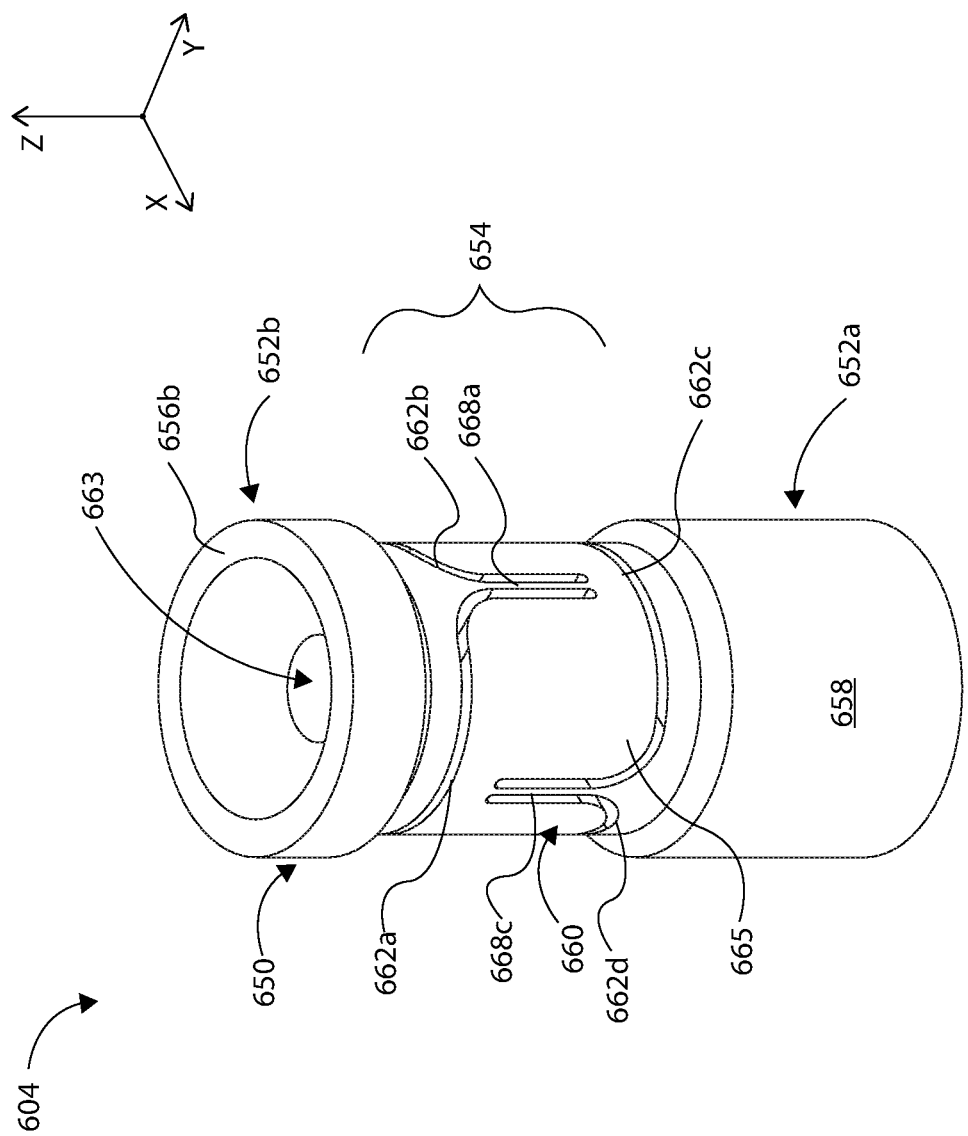
FIG. 6 is an isometric view of a flexure unit in accordance with an example of the present disclosure.
Figure 8:
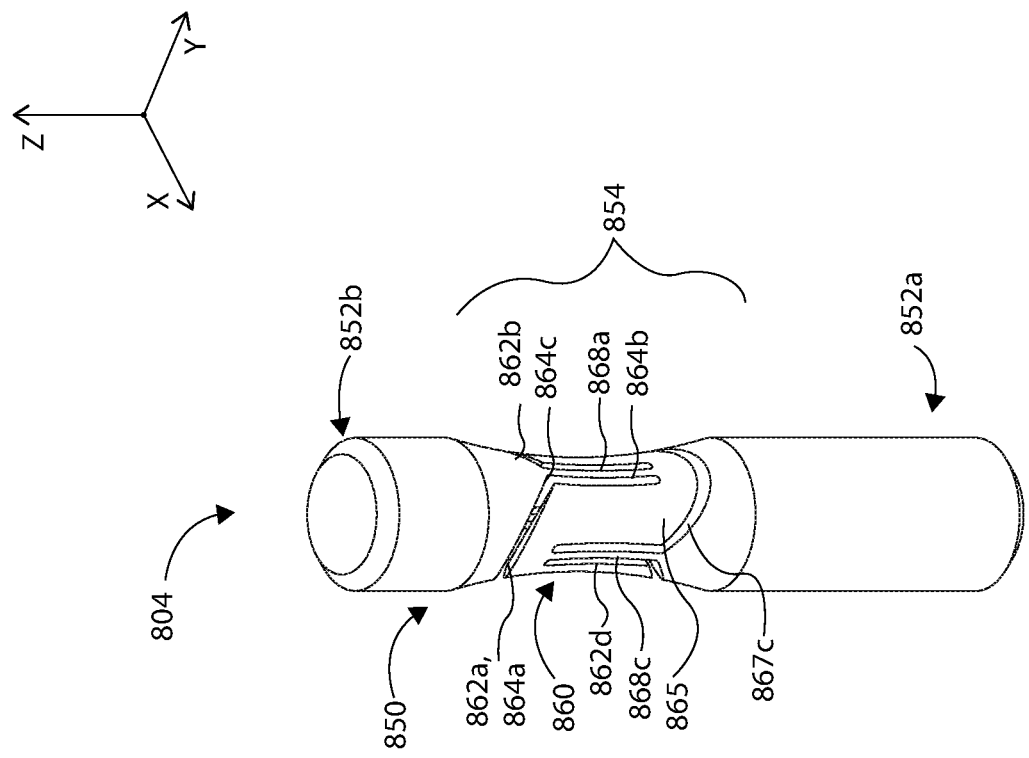
FIG. 8 is an isometric view of a flexure unit in accordance with an example of the present disclosure.
Figure 7:
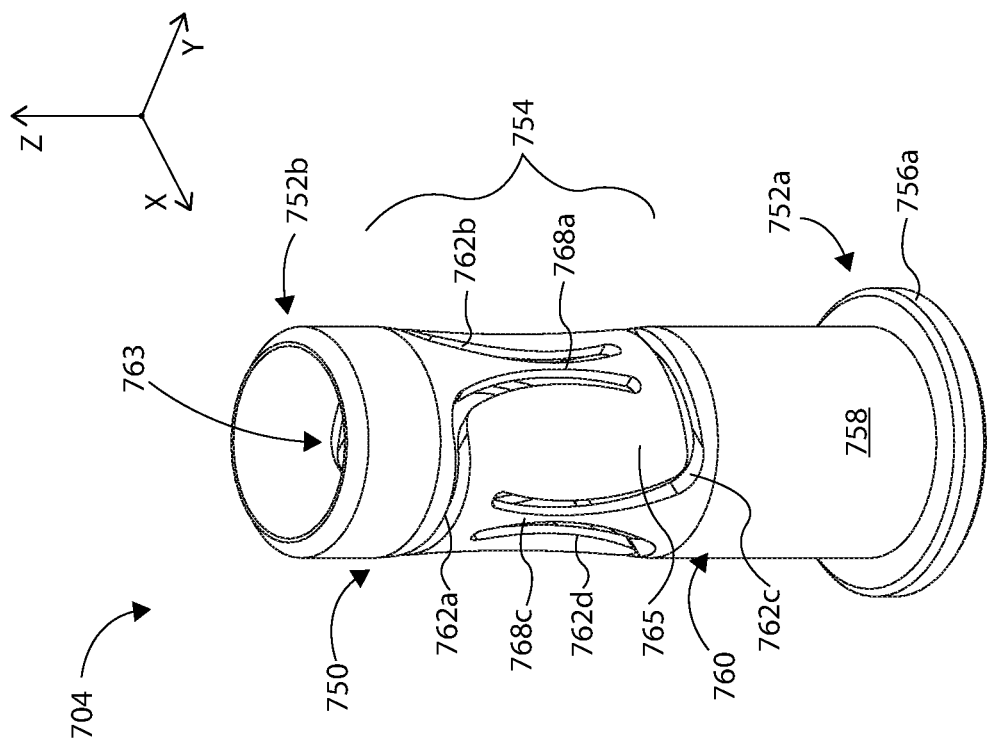
FIG. 7 is an isometric view of a flexure unit in accordance with an example of the present disclosure.

FIGS. 6, 7, and 8 show various examples of flexure units that could be incorporated with a flexure spring mass body, such as flexure spring mass body 102 described herein. As further detailed below, a particular flexure unit can be formed to have a particular "response tenability" by selecting the diameter, shape, size, and slot/flexure configuration for a particular application. Indeed, the flexure units exemplified herein can be used to better address certain load configurations because of their shape, size, flexure configurations, etc., as further discussed herein. Moreover, the flexure units exemplified herein can better accommodate or utilize the available volume or space in an assembly, and particularly smaller assemblies with limited packaging size.

For instance, FIG. 6 shows a flexure unit 604 that can comprise a body 650 having first and second ends 652a and 652b, and a flex section 654 that is located and that extends a distance between the first and second ends 652a and 652b. The first end 652a of the flexure unit 604 can have an interface wall 658 that can be brazed or adhered or otherwise secured to an interface wall (e.g., 124) the flexure spring mass body (e.g., flexure spring mass body 102). The second end 652b of the flexure unit 604 can comprise an annular flange 656b that can be interfaced or attached (e.g., brazed, adhered, or otherwise secured) to an inner surface (e.g., 126) of the second body section (e.g., 106b of FIG. 3B), so that the second end 652b of the flexure unit 604 is fixed to the second body section (e.g., 106b). In this way, the flexure unit 604 can bend or flex about the flex section 654 when the second body section (e.g., 106b) is rotated relative to the first body section (e.g., 106a) about the x and/or y axes. The body 650 can comprise an outer surface 660, which include various radial or annular surfaces. The flex section 654 can include a plurality of slots 662a-d formed through the outer surface 660 and a radial wall section 665 of the body 650, and that are each in fluid communication with a central aperture 663 of the flexure unit 604. The slots 662a-d can be formed similarly or the same as shown and described with reference to the example of FIG. 2, thereby forming four flexures 668a-d (only flexures 668a and 668c being shown, with the other two out of view, but similar to the flexures of the example of FIG. 2). Therefore, the first and second flexures 668a and 668b facilitate the bending or flexing of the second end 652b about the y axis (to achieve a first rotational degree of freedom), and the third and fourth flexures 668c and 668d facilitate the bending or flexing of the second end 652b about the x axis (to achieve a second rotational degree of freedom). The flexure unit 604 is further operable to restrict relative movement of the second body section (e.g., 106b) relative to the first body section (e.g., 106a) of the flexure spring mass body (e.g., 102) (see FIG. 1) in the other four degrees of freedom. Indeed, the flexure unit 604 can restrict axial movement of the second body section relative to the first body section about the x axis and the y axis via the flexures 668a-d, and can restrict axial movement about the z axis of the second body section relative to the first body section via the tension or tensile characteristics provided by the flexure unit 604 being attached to the first and second body sections to restrict z axis movement of the body sections, similarly as described regarding flexure unit 104 FIGS. 1-5B.

FIG. 7 shows a flexure unit 704 that can comprise a body 750 that can comprise first and second ends 752a and 752b, and a flex section 754 that is located and that extends a distance between the first and second ends 752a and 752b. The first end 752a can comprise an annular flange 756a that interfaces with a shoulder of a supporting structure, such as a flexure spring mass body (e.g., flexure spring mass body 102). The flexure unit 704 can have an interface wall 758 that can be brazed or adhered or otherwise secured to the flexure spring mass body (e.g., 102). The second end 752b of the flexure unit 704 can be interfaced or attached (e.g., brazed, adhered, or otherwise secured) to an inner surface (e.g., 126) of the second body section (e.g., 106b of FIG. 3B), so that the second end 752b of the flexure unit 704 is fixed to the second body section (e.g., 106b). In this way, the flexure unit 704 can bend or flex about the flex section 754 when the second body section (e.g., 106b) is rotated relative to the first body section (e.g., 106a) about the x and/or y axes. The body 750 can comprise an outer surface 760, which include various radial or annular surfaces. The flex section 754 can have an outer curved surface profile (a cylindrical configuration having a uniform circular cross-section at any point about a central longitudinal z axis), and can include a plurality of slots 762a-d formed through the outer surface 760 and a radial wall section 765 of the body 750, and that are each in fluid communication with a central aperture 763 of the flexure unit 704. The slots 762a-d can be formed similarly as shown and described with reference to the example of FIG. 2, thereby forming four curved flexures 768a-d (two being shown, namely flexures 768a and 768c). A notable difference of the slots 762a-d of the flexure unit 704 from the slots 162a-d of the flexure unit 104 of FIG. 2 is that second slot portions of the respective slots 762a-d, with their terminal ends, are somewhat curved along a longitudinal z axis, so that the flexures 768a-d each have a curved profile on both sides (i.e., each second portion comprises a curved profile so as to form a flexure having two curved sides or edges) (as compared to a linear or straight profile of the flexures 168a-d of FIG. 2). This configuration can generate a non-linear bending moment about the flexures 768a-d, which can be beneficial in certain applications. This curved profile of the flexures 768a-d maintains a relatively small cross-sectional area of the flexure unit 704 where bending occurs, but then has a wider or thicker area away from that bending location, which increases or maximizes the stiffness of the flexure unit, thereby reducing stress in the particular flexure unit and/or the flexure spring mass body (e.g., 102) for loads in one or more directions acting on the flexure spring mass body. The first and second flexures 768a and 768b facilitate the bending or flexing of the second end 752b about the y axis (to achieve a first rotational degree of freedom), and the third and fourth flexures 768c and 768d facilitate the bending or flexing of the second end 752b about the x axis (to achieve a second rotational degree of freedom), the flexure unit 704 further being operable to restrict relative movement of the second body section (e.g., 106b) relative to the first body section (e.g., 106a) of the flexure spring mass body (e.g., 102) (see FIG. 1) in the other four degrees of freedom. Indeed, the flexure unit 704 can restrict axial movement of the second body section relative to the first body section about the x axis and the y axis (via the flexures 768a-d), and can restrict axial movement about the z axis of the second body section relative to the first body section (via the tension or tensile characteristics provided by the flexure unit 704 being attached to the first and second body sections to restrict z axis movement of the body sections, similarly as described regarding flexure unit 104 FIGS. 1-5B).

FIG. 8 shows a flexure unit 804 that can comprise a body 850 that can comprise first and second ends 852a and 852b, and a flex section 854 that is located and that extends a distance between the first and second ends 852a and 852b. The first end 852a and the second end 852b can each be brazed or adhered or otherwise secured to respective support surfaces of a flexure spring mass body (e.g., flexure spring mass body 102). In this way, the flexure unit 804 can bend or flex about the flex section 854 when the second body section (e.g., 106b) is rotated relative to the first body section (e.g., 106b) about the x and/or y axes. The body 850 can comprise an outer surface 860, which includes various radial or annular surfaces. The flex section 854 can have an outer curved surface profile that is curved in two directions. For example, the flex section 854 can comprise a circular cross-sectional area at any point about a central longitudinal z axis, which cross-section can further be non-uniform about the same central longitudinal z axis (i.e., the cross-sectional areas are not uniform (not the same size) from point to point along the central longitudinal z axis). The flexure section can include a plurality of slots 862a-d formed through the outer surface 860 and a radial wall section 865 of the body 850, and therefore the plurality of slots 862a-d can be formed through an entire, lateral cross-sectional area of the body 850 (as compared to flexure unit 104 that includes a central aperture formed through a center of the body). Thus, the body 850 can be a solid body about the first and second ends 652a and 652b, where the slots 862a-d are formed in the solid body 850. The slots 862a-d can be formed similarly as shown and described with reference to the example of FIG. 2, thereby forming four flexures 868a-d (two shown being shown, namely flexures 868a and 868c). A notable difference of the slots 862a-d of the flexure unit 804 from the slots 162a-d of the flexure unit 104 of FIG. 2 is that transition slot portions (e.g., 864c) of the slots 862a-d can be formed at a straight angle. Also, a first slot portion (e.g., 864a) of the slots 862a-d can be formed laterally through the body 850 at an angle relative to an x,y plane. Thus, the slots 862a-d can comprise slot profiles cut or formed through the body 850 that are different from those discussed above. This configuration can generate a non-linear bending moment about the flexures 868a-d, which can be beneficial in certain applications. This curved profile of the flexures 868a-d maintains a relatively small cross sectional area of the flexure unit 804 where bending occurs, but then has a wider or thicker area away from that bending location, which increases or maximizes the stiffness of the flexure unit, thereby reducing stress in the particular flexure unit and/or the flexure spring mass body (e.g., 102) for loads in one or more directions acting on the flexure spring mass body. The first and second flexures 868a and 868b facilitate the bending or flexing of the second end 852b about the y axis (to achieve a first rotational degree of freedom), and the third and fourth flexures 868c and 868d facilitate the bending or flexing of the second end 852b about the x axis (to achieve a second rotational degree of freedom). The flexure unit 804 is further operable to restrict relative movement of the second body section (e.g., 106b) relative to the first body section (e.g., 106a) of the flexure spring mass body (e.g., 102) (see FIG. 1) in the other four degrees of freedom. Indeed, the flexure unit 804 can restrict axial movement of the second body section relative to the first body section about the x axis and the y axis (via the flexures 868a-d), and can restrict axial movement about the z axis of the second body section relative to the first body section (via the tension or tensile characteristics provided by the flexure unit 804 being attached to the first and second body sections to restrict z axis movement of the body sections, similarly as described regarding flexure unit 104 FIGS. 1-5B).

The various flexure units and flexure spring mass bodies exemplified herein can be formed of a rigid or semi-rigid material, such steel, titanium, aluminum, etc., and can be fabricated by EDM wire machining techniques, although other fabrication techniques can be used (e.g., 3D printing, additive manufacturing, casting, molding, machining, etc.).

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A flexure unit operable for use with a flexure spring mass body, the flexure unit comprising:
a flexure body having a flex section comprising an outer surface that has a circular cross-section that is non-uniform along a longitudinal axis of the flexure body;
a first slot formed in the flex section of the flexure body through the outer surface, the first slot comprising a first slot portion and a second slot portion extending in different directions;
a second slot formed in the flex section of the flexure body opposite the first slot through the outer surface, the second slot comprising a first slot portion and a second slot portion extending in different directions,
wherein the first and second slots, at least in part, define first and second flexures that facilitate flex of the flexure unit in a first rotational degree of freedom.

2. The flexure unit of claim 1, wherein the first slot and the second slot are formed substantially identical to each other, and are formed radially around opposing sides of the flexure body.

3. The flexure unit of claim 1, wherein the first and second flexures each comprise a linear flexure defined by overlapping portions of the first and second slots.

4. The flexure unit of claim 1, wherein the first and second flexures each comprises a curved flexure configuration defined by overlapping portions of the first and second slots.

5. The flexure unit of claim 1, further comprising:
a third slot formed in the flexure body through the outer surface, the third slot comprising a third slot portion and a second slot portion extending in different directions;
a fourth slot formed in the flexure body opposite the third slot through the outer surface, the fourth slot comprising a first slot portion and a second slot portion extending in different directions,
wherein the third and fourth slots, at least in part, define third and fourth flexures that facilitate flex of the flexure unit in a second rotational degree of freedom.

6. The flexure unit of claim 5, wherein the first and second flexures are radially oriented ninety degrees around the outer surface relative to the third and fourth flexures.

7. The flexure unit of claim 5, wherein the first and second slots are formed in a nesting arrangement with the third and fourth slots.

8. The flexure unit of claim 5, wherein the first, second, third, and fourth slots are configured the same.

9. The flexure unit of claim 5, wherein the flexure body comprises a generally cylindrical shape, and comprises a central aperture formed through a central area of the flexure body to define a radial wall section of the flexure body, wherein the first, second, third, and fourth slots are formed through the radial wall section and are in fluid communication with the central aperture.

10. The flexure unit of claim 5, wherein the flexure body comprises a first end and a second end, and the flex section is formed between the first end and the second end, wherein the first, second, third, and fourth slots are formed through the flex section, such that the first end is operable to flex relative to the second end in two rotational degrees of freedom.

11. A flexure unit, comprising:
a body having a flex section comprising an outer surface that has a circular cross-section that is non-uniform along a longitudinal axis of the body;
a first longitudinal flexure defined by a first pair of overlapping portions of first and second slots formed in the body;

a second longitudinal flexure defined by a second pair of overlapping portions of the first and second slots formed in the body.

12. The flexure unit of claim 11, further comprising:
a third longitudinal flexure defined by a first pair of overlapping portions of third and fourth slots formed in the body;
a fourth longitudinal flexure defined by a second pair of overlapping portions of the third and fourth slots formed in the body.

13. The flexure unit of claim 12, wherein the first, second, third, and fourth slots are each formed to comprise at least one of a planar or a nonplanar slot shape.

14. The flexure unit of claim 12, wherein the first, second, third, and fourth longitudinal flexures each extend generally parallel to each other and to a longitudinal central axis of the body.

15. A flexure spring mass body, comprising:
a first body section;
a second body section operable to bend relative to the first body section;
a flexure diaphragm that interconnects the first body section to the second body section, the flexure diaphragm defined by a first slot formed laterally through the flexure spring mass body about a first plane, and by a second slot formed laterally through the flexure spring mass body about a second plane, wherein the second slot is formed orthogonally relative to the first slot, such that the flexure diaphragm facilitates bending of the second body section relative to the first body section; and
a central aperture that extends centrally through the first and second body sections and through the flexure diaphragm, the flexure diaphragm completely surrounding the central aperture.

16. The flexure spring mass body of claim 15, wherein the first slot comprises a length that is less than a corresponding overall length of the first body section, and wherein the second slot comprises a length that is less than a corresponding overall length of the first body section in an orthogonal direction.

17. The flexure spring mass body of claim 15, wherein the flexure diaphragm comprises a first pair of opposing flexure sections operable to facilitate bending of the second body section in a first rotational degree of freedom, and a second pair of opposing flexure sections operable to facilitate bending of the second body section in a second rotational degree of freedom.

18. The flexure spring mass body of claim 15, wherein the central aperture is configured to receive and support a flexure unit operable with the flexure diaphragm to limit an amount of bending of the first and second body sections relative to one another.

19. The flexure spring mass body of claim 15, wherein the first and second body sections each comprise a stop portion formed about a peripheral edge portion of the respective first and second body section and adjacent a respective first and second slots, wherein the stop portion operate to limit movement of the second body section relative to the first body section.

20. A dual-axis flexure gimbal device, comprising:
a flexure spring mass body comprising first and second body sections, a flexure diaphragm that interconnects the first and second body sections, and a central aperture formed through the first and second body sections and the flexure diaphragm, the flexure diaphragm completely surrounding the central aperture; and
a flexure unit situated in the central aperture and supported by the flexure spring mass body, the flexure unit comprising a plurality of slots defining a plurality of flexures,
wherein, in response to bending of the first body section relative to the second body section, the flexure diaphragm is operable to bend in first and second rotational degrees of freedom, and the plurality of flexures of the flexure unit are operable to flex in respective first and second rotational degrees of freedom.

21. The dual-axis flexure gimbal device of claim 20, wherein the flexure unit restricts axial movement of the first body section relative to the second body section in any direction.

22. The dual-axis flexure gimbal device of claim 20, wherein the first body section comprises an optical mirror interface for mounting to an optical mirror, and wherein the second body section comprises a gimbal support housing interface for mounting to a gimbal support body.

23. The dual-axis flexure gimbal device of claim 20, wherein the plurality of flexures of the flexure unit are formed generally parallel to a central longitudinal axis of the central aperture, and wherein the flexure diaphragm is formed generally perpendicular relative to the flexures and to the central longitudinal axis.

24. A fast-steering mirror assembly comprising an optical mirror and a gimbal support housing, and a dual-axis flexure gimbal device operatively coupled to the optical mirror and the gimbal support housing, the dual-axis flexure gimbal device comprising:
a flexure spring mass body comprising a first body section attached to the optical mirror, and a second body section attached to a gimbal support housing, the flexure spring mass body comprising a flexure diaphragm that interconnects the first and second body sections, and a central aperture formed through the first and second body sections and the flexure diaphragm, the flexure diaphragm completely surrounding the central aperture; and
a flexure unit situated in the central aperture and supported by the flexure spring mass body, the flexure unit comprising a plurality of slots defining a plurality of flexures,
wherein, in response to bending of the first body section relative to the second body section, the flexure diaphragm is operable to bend in first and second rotational degrees of freedom, and the plurality of flexures of the flexure unit are operable to flex in respective first and second rotational degrees of freedom.

25. A method of making a dual-axis flexure gimbal device, comprising:
forming a flexure spring mass body comprising first and second body sections, a flexure diaphragm that interconnects the first and second body sections together, and a central aperture formed through the first and second body sections and the flexure diaphragm, the flexure diaphragm completely surrounding the central aperture; and
forming a flexure unit comprising a body sized and shaped to fit within the central aperture of the flexure spring mass body, the flexure unit comprising a plurality of slots that define a plurality of flexures.

26. The method of claim 25, wherein forming the flexure unit comprises forming the plurality of slots to comprise a first pair of opposing slots formed through an outer surface of the body to facilitate bending of the first body section relative to the second body section in a first rotational degree of freedom, and a second pair of opposing slots formed through the outer surface to facilitate bending of the first body section relative to the second body section in a second rotational degree of freedom.

27. The method of claim 25, wherein forming the flexure spring mass body comprising forming a first slot laterally through the flexure spring mass body about a first plane, and a second slot laterally through the flexure spring mass body about a second plane, such that the second slot is formed orthogonally relative to the first slot, and such that the flexure diaphragm facilitates bending of the second body section relative to the first body section.

* * * * *